United States Patent
Wagoner

[11] Patent Number: 5,934,142
[45] Date of Patent: Aug. 10, 1999

[54] TWO PIECE CONTINUOUS MESH SYNCHRONIZED REVERSE IDLER SYSTEM

[75] Inventor: Brian L. Wagoner, Farmington Hills, Mich.

[73] Assignee: Chrysler Corporation, Auburn Hills, Mich.

[21] Appl. No.: 08/971,808

[22] Filed: Nov. 17, 1997

[51] Int. Cl.[6] .............................. F16H 3/38; F16H 3/08; F16D 11/00
[52] U.S. Cl. ........................... 74/339; 74/359; 192/53.35
[58] Field of Search ................... 74/339, 359; 192/53.35, 192/53.36

[56] References Cited

U.S. PATENT DOCUMENTS

| | | | |
|---|---|---|---|
| 2,555,963 | 6/1951 | Fishburn | 192/53.35 X |
| 4,463,622 | 8/1984 | Freiburger . | |
| 4,640,141 | 2/1987 | Knödel et al. . | |
| 4,856,361 | 8/1989 | Shinmoto . | |
| 5,280,731 | 1/1994 | Turpin . | |
| 5,479,835 | 1/1996 | Esparsa et al. . | |

OTHER PUBLICATIONS

*Manual Transmission Synchronizers*, No. 680008, Socin, Richard J. Walters, L. Kirk.

*Primary Examiner*—John A. Jeffery
*Assistant Examiner*—Brandon C. Stallman
*Attorney, Agent, or Firm*—Kenneth H. Maclean

[57] ABSTRACT

A two-piece continuous mesh synchronized reverse idler system is provided for use with a manual transmission. The system is provided for use with a vehicle transmission having an input shaft with a reverse driven gear, and an intermediate shaft with a reverse driven gear. The reverse idler system includes a reverse idler shaft which supports an upstream idler gear and a downstream idler gear. The upstream idler gear is rotatably mounted on the reverse idler shaft for engaging the reverse drive gear on the input shaft. The downstream idler gear is rotatably mounted on the reverse idler shaft for engaging the reverse driven gear on the intermediate shaft. A clutching device is provided for synchronizing and engaging the upstream reverse idler gear and the downstream reverse idler gear.

2 Claims, 2 Drawing Sheets

5,934,142

TWO PIECE CONTINUOUS MESH SYNCHRONIZED REVERSE IDLER SYSTEM

BACKGROUND OF THE INVENTION

1. Field of the Invention

The present invention relates to a reverse idler system for use with an automotive transmission, and more particularly, to a two-piece continuous mesh synchronized reverse idler system.

2. Description of Related Art

Automotive manual transmissions are typically designed with an input shaft supporting a plurality of drive gears having varying diameters, as well as an output or an intermediate shaft supporting a plurality of driven gears having varying diameters and meshingly engaged with the drive gears of the input shaft. By selectively engaging the driven gears with the output or intermediate shaft, varying transmission gear ratios are obtained.

Typical manual transmission reverse systems use an axially sliding spur gear idler configuration. Power is transmitted from a reverse gear on the manual transmission input shaft to the reverse gear on the intermediate shaft by a reverse idler used to reverse rotational direction of the intermediate shaft. The reverse gear on the intermediate or the output shaft is fixedly engaged with the intermediate shaft. To engage reverse, the reverse idler gear is moved axially along the reverse idler shaft by a lever arrangement, and is slid into mesh with both the input shaft reverse gear and the reverse gear on the intermediate shaft. All three gear elements are spur gear designs. Pointing features are arranged on the ends of the spur gear teeth to index the gears so the idler gear can slide entirely into position. Because of the constraints associated with a sliding idler gear design, imprecise engagement exists which result in clash and block outs. Furthermore, packaging restrictions can limit the amount of tooth engagement available, which results in durability related problems of the spur gear design. Gear noise can also be objectionable with spur gears.

SUMMARY OF THE INVENTION

Accordingly, the present invention provides a fully synchronized reverse gear system for a manual transmission application eliminating reverse gear clash and block out and providing quieter engagement of reverse. The system of the present invention also utilizes helical gear forms to improve system durability and reduce reverse gear noise. In particular, a reverse idler system is provided for use with a vehicle transmission having an input shaft with a reverse drive gear and an intermediate shaft with a reverse driven gear. A reverse idler system includes a reverse idler shaft rotatably supporting an upstream idler gear and a downstream idler gear. Upstream and downstream refer to the direction of torque transmittal from the input shaft to the intermediate shaft. The upstream idler gear is mounted on the reverse idler shaft for engaging the reverse drive gear on the input shaft. The downstream idler gear is mounted on the reverse idler shaft for engaging the reverse driven gear of the intermediate shaft. A synchronizing clutching device is provided for engaging the upstream idler gear with the downstream idler gear during a reverse shift.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
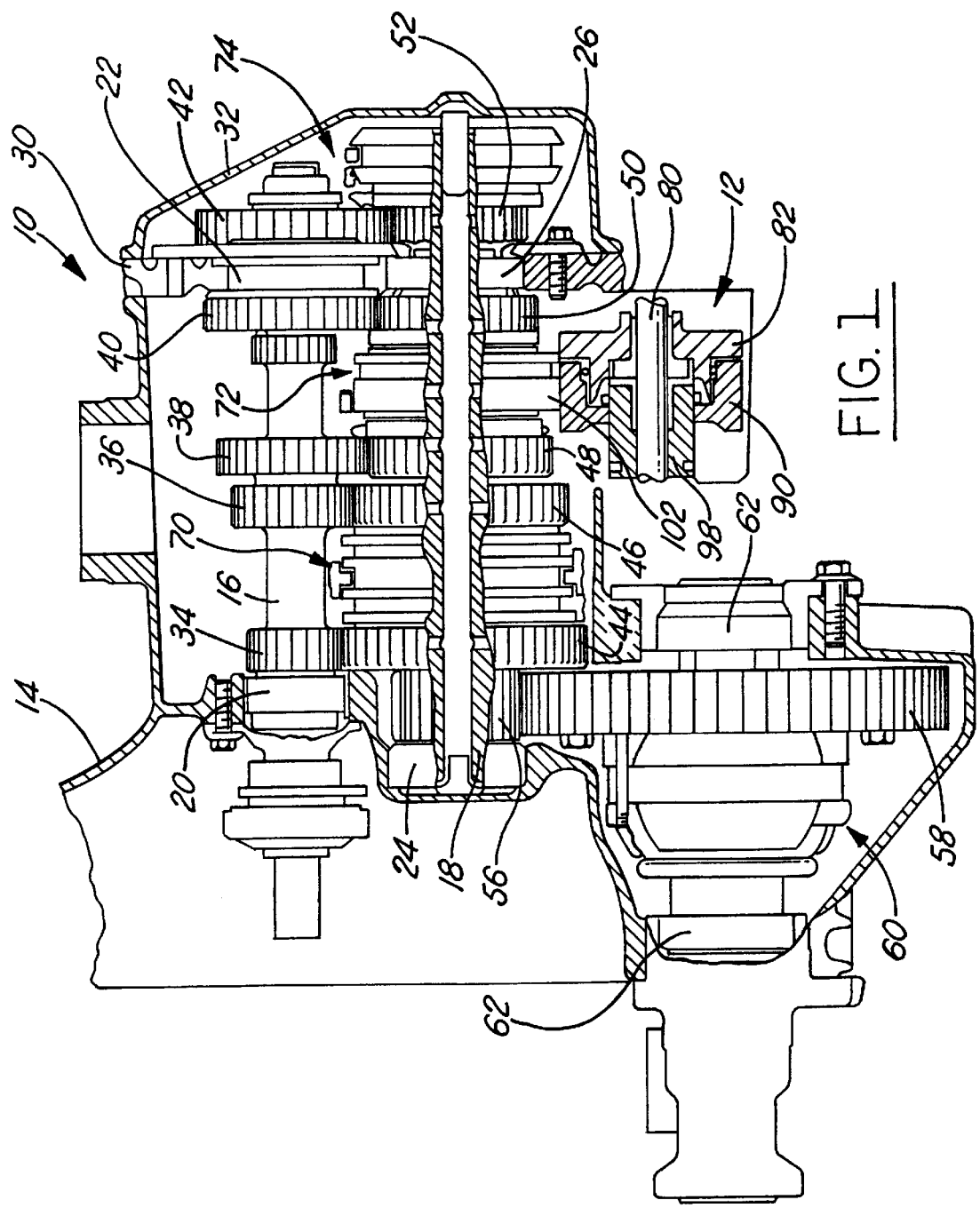
FIG. 1 is a cross-sectional view of a manual transmission including a two-piece continuous mesh synchronized reverse idler system according to the principles of the present invention.

Referring to FIG. 1, a manual transmission 10 is shown with a two-piece continuous mesh synchronized reverse idler system 12. The manual transmission includes a casing 14 which supports an input shaft 16 and an intermediate shaft 18. It should be noted that the term "intermediate shaft" is used herein to designate a counter shaft or an output shaft depending on the manual transmission and driveline configuration. The input shaft 16 is supported on a first end by a front bearing assembly 20 and is supported on a second end by a rear input shaft bearing assembly 22. The intermediate shaft 18 is supported at a first end by a front intermediate shaft bearing assembly 24 and is supported on a second end by a rear intermediate shaft bearing assembly 26. The rear input shaft bearing assembly 22 and the rear intermediate shaft bearing assembly 26 are each supported by a bearing support plate 30. A cover assembly 32 is provided on the end of the transmission case 14.

Input shaft 16 is provided with a first gear step 34, a second gear step 36, a third gear step 38, a fourth gear step 40 and a fifth gear step 42. A first driven gear 44, a second driven gear 46, a third driven gear 48, a fourth driven gear 50 and a fifth driven gear 52 are rotatably mounted on the intermediate shaft 18 and are in constant meshing engagement with first through fifth gear steps 34–42, respectively.

Intermediate shaft 18 is provided with a final drive gear 56 which engages a final driven ring gear 58 of a differential assembly 60. The differential assembly 60 is provided with differential bearings 62 which support the housing thereof.

A first and second gear synchronizer device 70 is disposed between first driven gear 44 and second driven gear 46 for operatively engaging the first driven gear 44 and the second driven gear 46 to the intermediate shaft 18. A third and fourth gear synchronizing device 72 is disposed between the third driven gear 48 and the fourth driven gear 50 for operatively engaging the third driven gear 48 and the fourth driven gear 50 with the intermediate shaft 18. A fifth gear synchronizer device 74 is provided for engaging the fifth driven gear 52 with the intermediate shaft 18.

Figure 3:
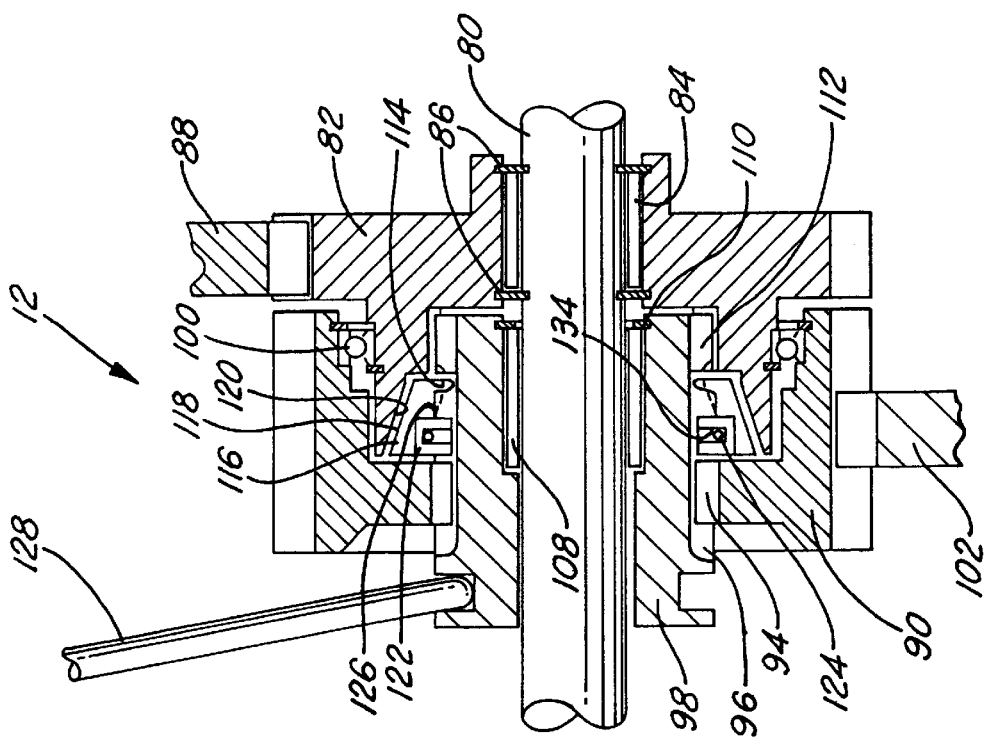
FIG. 3 is a detailed cross-sectional view similar to FIG. 2 with the two-piece continuous mesh synchronized reverse idler system shown in the engaged position.
Figure 2:
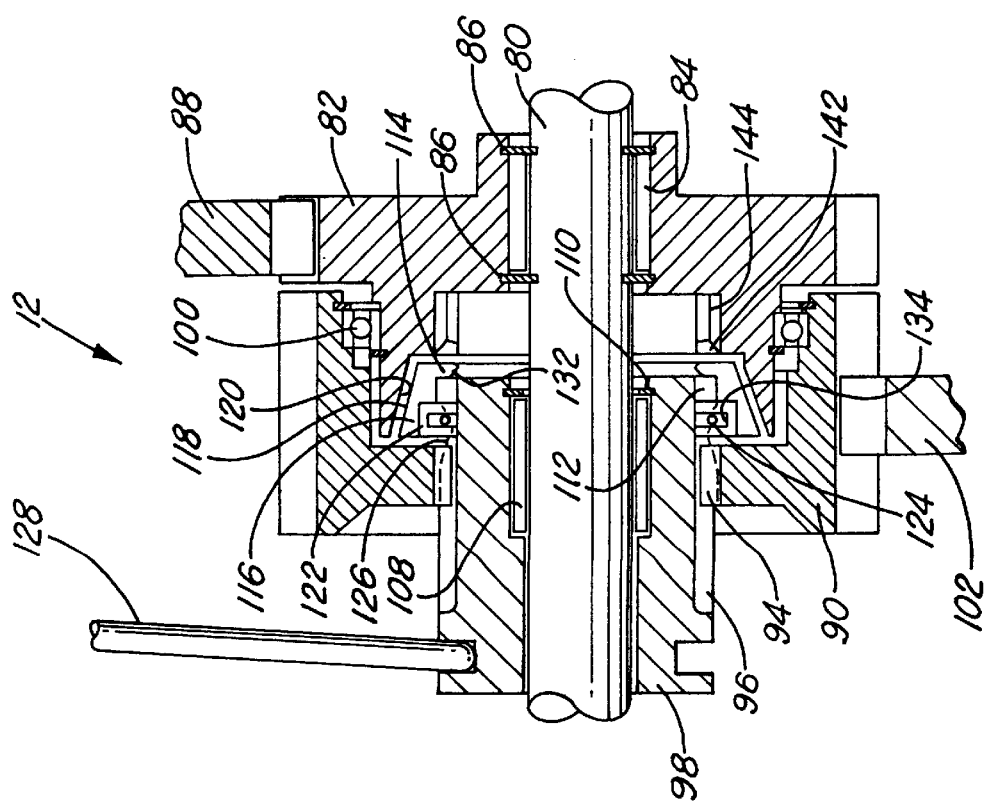
FIG. 2 is a detailed cross-sectional view of the two-piece continuous mesh synchronized reverse idler system shown in the disengaged position.

The two-piece continuous mesh synchronized reverse idler system 12 according to the present invention includes a reverse idler shaft 80 mounted to the transmission casing 14. As best shown in FIGS. 2 and 3, an upstream reverse idler gear 82 is rotatably mounted on the reverse idler shaft 80 by a needle bearing assembly 84. The axial position of needle bearing assembly 84 is fixed on the reverse idler shaft 80 by circlips 86. The axial position of the upstream idler 82 relative to both the input shaft 16 and the reverse idler shaft 80 is fixed also. The upstream reverse idler gear 82 has a helical tooth form which is meshingly engaged with a reverse gear step 88 on the input shaft 16. A downstream reverse idler gear 90 is mounted via a sliding spline interface 94/96 to the sliding actuator element 98. A bearing assembly 100 is provided between the upstream reverse idler gear 82 and the downstream idler gear 90 in order to maintain their position relative to one another. The downstream reverse idler gear 90 has a helical gear form which is in meshing engagement with a reverse driven gear 102 mounted on the sleeve of the third and fourth gear synchronizer device 72. The downstream reverse idler gear 90 is provided with internal splines 94 which engage external splines 96 of the sliding actuator element 98 rotatably mounted on the reverse idler shaft 80 by a needle bearing assembly 108. The axial position of bearing assembly 108 relative to actuating element 98 is fixed by circlip 110. The external spline teeth 96 of the sliding actuator element 98, allow axial movement relative to the several components of the idler assembly 12. As the actuator element 98 slides axially along reverse idler shaft 80, bearing 108 moves with it. The spline teeth 96 are provided with chamfered ends 112 to interface with the chamfered blocker teeth 114, index the blocker ring 116, and index the upstream idler 82 after full synchronization.

The synchronized reverse idler system 12 includes the blocker ring 116 with a conical friction surface 118 to interface with a cone friction surface 120 on the upstream reverse idler gear 82. The blocker ring 116 is actuated by a set of strut-type elements 122 indexed to the splines 96. The strut elements 122 enclose a spring 124 which engages a machined profile 126 in the sliding actuator element 98 for actuating the synchronizer spring 124. A reverse actuator lever 128 engages the sliding actuator spline element 98 for engaging the synchronizing clutching device. The blocker ring 116 includes a plurality of internal spline teeth containing chamfered ends 132 oriented toward the sliding actuator spline element 98 which are engaged by the chamfered ends 112 of sliding actuator spline element 98. The strut-type elements 122 consist of a plurality of partial ring segments which are internally splined and indexed to the sliding actuator spline element 98. The spring 124 is generally C-shaped and is received within a spring pocket 134 of strut elements 122.

In operation, the upstream and downstream reverse idler gears 82,90 run in constant mesh with their respective gears 88,102 on the input and intermediate shafts 16,18, respectively. During forward driving of the vehicle, the upstream and downstream reverse idler gears 82,90 turn in opposite directions to each other. When the manual transmission 10 is shifted to either third or fourth gear, the three-four synchronizer sleeve can travel axially along the three-four synchronizer assembly (72) hub to engage third or fourth gear without disengaging mesh between the reverse gear 102 on the three-four sleeve and the downstream reverse idler gear 90. When reverse is to be engaged, the reverse gear 102 on the three-four sleeve is centered above the downstream idler half 90. To engage reverse, the reverse lever 128 is actuated as shown in FIG. 3 to drive the sliding actuator spline element 98 and blocker ring 116 toward the upstream reverse idler gear 82, axially down the reverse idler shaft 80. The detent profile 126 on the outside diameter of the sliding actuator spline element 98 loads the synchronizer spring/ strut combination 124/122, and energizes the synchronizer blocker ring 116 and cone 120 interface. The relative speed between the upstream and downstream reverse idler gears 82,90 is brought to zero. The chamfered ends 112 of spline 96 index the blocker ring 116 via chamfers 132. Spline 96 of the sliding actuator 98 then breaks through the internal teeth 114 of the blocker ring 116 to engage the chamfer of clutching teeth 144 in the upstream reverse idler gear 82. Upstream reverse idler gear 82 indexes rotationally to allow spline 96 of the sliding actuator element 98 to enter full axial engagement with clutching teeth 144 of upstream idler 82. Accordingly, the reverse gear 102 is engaged for driving the intermediate shaft 18 in the reverse direction.

The two-piece continuous mesh synchronized reverse idler system 12 for manual transmission application eliminates reverse gear clash and block out, and provides quieter engagement of reverse. Reverse system durability is improved, and gear noise under operation is reduced. The upstream and downstream reverse idler gears include helical gear elements featuring opposite helix angles to generate opposite and offsetting axial thrust loads from each mesh, for a resultant zero thrust load of the engaged idler to the bearings during operation in reverse. The present invention provides a flexible arrangement lending to the opportunity to modify the individual mesh designs for increased durability while also achieving desired ratios. In particular, the design is not constrained to one idler gear form in mesh with two other gears. The meshes for the upstream and downstream reverse idler gear portions can be individually optimized for gear durability, strength, noise and rattle without restriction to a common gear. Further, helical gears can be packaged in the same space as spur gears, increasing the gear system torque transmitting capacity. The use of helical reverse gear designs reduce gear noise and minimizes rattle.

Feasibility is provided to synchronize two immediately adjacent gear meshes through means of this internal sliding actuator and synchronizer arrangement, without the typical need to provide axial packaging space between the gears required by an external synchronizer sleeve.

Further opportunity exists to incorporate a spring configuration to enable a strutless energizing of the blocker ring during actuation of the system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reverse idler system for use with a vehicle transmission having an input shaft with a reverse drive gear and an intermediate shaft with a reverse driven gear, said reverse idler system comprising:

a reverse idler shaft;

an upstream idler gear mounted on said reverse idler shaft for engaging the reverse drive gear;

a downstream idler gear mounted on said reverse idler shaft for engaging the reverse driven gear;

a clutching device for engaging said upstream idler gear with said downstream idler gear;

wherein said clutching device includes a sliding actuator disposed on said reverse idler shaft;

wherein said sliding actuator includes a spline portion engaged with a corresponding spline portion on one of said upstream idler gear and said downstream idler gear;

wherein said upstream idler gear is provided with a first friction surface operatively engaged by a second friction surface operatively associated with said clutching device;

wherein said second friction surface is disposed on a blocker ring concentrically mounted on said sliding actuator;

wherein said blocker ring includes axially chamfered internal teeth which are energized and indexed by clutching spline teeth of said sliding actuator; and wherein said blocker ring is provided with a strut device which positions a spring for engagement with a detent profile on said sliding actuator such that axial movement of said sliding actuator relative to said strut device causes said spring to bias said blocker ring against said first friction surface.

2. A reverse idler system for use with a vehicle transmission having an input shaft with a reverse drive gear and an intermediate shaft with a reverse driven gear, said reverse idler system comprising:

a reverse idler shaft;

an upstream idler gear mounted on said reverse idler shaft for engaging the reverse drive gear;

a downstream idler gear mounted on said reverse idler shaft for engaging the reverse driven gear; and a clutching device for engaging said upstream idler gear with said downstream idler gear, wherein said clutching device includes a sliding actuator disposed on said reverse idler shaft; and wherein said sliding actuator is mounted to said reverse idler shaft by a bearing and clip arrangement which allows said sliding actuator to move axially relative to said reverse idler shaft.

* * * * *